(12) United States Patent
Chen et al.

(10) Patent No.: US 10,592,671 B2
(45) Date of Patent: *Mar. 17, 2020

(54) PREVENTING CODE MODIFICATION AFTER BOOT

(71) Applicant: Microsoft Technology Licensing, LLC, Redmond, WA (US)

(72) Inventors: Ling Tony Chen, Bellevue, WA (US); Felix Stefan Domke, Luebeck (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,307

(22) Filed: Dec. 29, 2017

(65) Prior Publication Data

US 2018/0196946 A1 Jul. 12, 2018

Related U.S. Application Data

(63) Continuation of application No. 14/310,463, filed on Jun. 20, 2014, now Pat. No. 9,875,358.

(51) Int. Cl.
*G06F 21/57* (2013.01)
*G06F 9/4401* (2018.01)

(52) U.S. Cl.
CPC .......... *G06F 21/575* (2013.01); *G06F 9/4401* (2013.01)

(58) Field of Classification Search
CPC .............................. G06F 21/575; G06F 9/4401
See application file for complete search history.

(56) References Cited

U.S. PATENT DOCUMENTS

| 6,026,016 A * | 2/2000 | Gafken | G06F 12/1433 |
| | | | 365/185.04 |
| 6,188,602 B1 * | 2/2001 | Alexander | G06F 12/1466 |
| | | | 365/185.04 |
| 2003/0233533 A1 * | 12/2003 | Avraham | G06F 9/4406 |
| | | | 713/1 |
| 2007/0226478 A1 * | 9/2007 | Rudelic | G06F 12/1408 |
| | | | 713/1 |
| 2008/0263256 A1 * | 10/2008 | Gudeth | G06F 12/145 |
| | | | 711/2 |
| 2015/0032996 A1 * | 1/2015 | Koeberl | G06F 9/3802 |
| | | | 712/205 |
| 2015/0186296 A1 * | 7/2015 | Guidry | G06F 21/54 |
| | | | 713/193 |
| 2015/0189509 A1 * | 7/2015 | Sheikh | H04L 63/10 |
| | | | 726/4 |

* cited by examiner

*Primary Examiner* — Kenneth M Lo
*Assistant Examiner* — Chad G Erdman

(57) ABSTRACT

The subject disclosure is directed towards protecting code in memory from being modified after boot, such as code used in a dedicated microprocessor or microcontroller. Hardware, such as in logic or in a memory protection unit, allows a range of memory to be made non-writeable after being loaded, e.g., via a secure boot load operation. Further, startup code that is used to configure the hardware/memory may be made non-executable after having run once, so that no further execution may occur in that space, e.g., as a result of an attack. A function in the runtime code may allow for a limited, attack-protected reconfiguration of sub-regions of memory regions during the runtime execution.

20 Claims, 11 Drawing Sheets

PREVENTING CODE MODIFICATION AFTER BOOT

CROSS-REFERENCE TO RELATED APPLICATION

The present application is a continuation of U.S. application Ser. No. 14/310,463 filed on Jun. 20, 2014, which is hereby incorporated by reference herein for all intents and purposes.

BACKGROUND

Many types of microprocessors and microcontrollers exist inside computers, peripheral devices and other systems, and the code they execute is susceptible to attacks. One type of code protection is to secure the boot code; keeping attackers out of the system at boot time has a number of solutions, including secure boot mechanisms and signed code verification mechanisms.

However, after boot, keeping attackers out of the boot-loaded code that gets executed is not as straightforward, as such code needs to interact and parse data from the outside world. Further, loaded code is typically larger and far more complex than boot code, and thus often contains bugs that make a microprocessor or microcontroller susceptible to being taken over by an attack.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a microcontroller or microprocessor, a memory, and a hardware component, in which the hardware component is configured to protect selected executable memory from write access after being loaded during a secure boot operation, including by being configured to change the state of the selected executable memory to non-writeable after code is loaded into the selected executable memory (until another boot operation). The hardware component may be further configured to protect a portion of executable memory from executing again once execution of code in the portion has completed.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards protecting loaded microprocessor or microcontroller code that gets executed after a secure boot operation. In one aspect, the technology may be applied to a particular class of microprocessors and microcontrollers, comprising those that, after a secure boot operation, no longer need to change the code that executes for that boot session. Thus, the technology described herein typically applies to a dedicated microprocessor or microcontroller, (as opposed to a general purpose programmable CPU, for example, which needs to support regularly loading new code as new applications are installed and loaded into the system).

To protect loaded code, in one aspect, after being loaded, selected protected code is locked in a way that prevents the code from ever being changed. Various example technologies are described herein that allow selected memory to be written to (by the secure boot code), but not executed, during the secure boot operation. Then, at the end of the boot operation, the memory is protected by being changed to become executable memory that is no longer writeable.

In one aspect, certain startup code that is executable for a time, e.g., one-time configuration code, then also becomes non-executable. As a result, an attacker cannot jump back into the startup code to reconfigure the system and thereby take it over.

In one aspect, existing architectures and associated instruction sets, or alternatively more customized hardware-based solutions may be used to accomplish protecting loaded code as exemplified herein. These examples, along with writing the microprocessor/microcontroller startup code in such a way that no new code can be added to protected memory and/or re-executed to facilitate an attack, prevent the system from being taken over, even if other portions of the code have been compromised.

It should be understood that any of the examples herein are non-limiting. For instance, some of the example description and drawings herein exemplify the solution implemented in an ARM R4 architecture with an ARM memory protection unit (MPU); however this is only one example and other architectures, including those in development or not yet developed, may benefit from the technology described herein, e.g., via appropriate hardware support and/or instructions for their respective instruction sets. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in secure computing in general.

Figure 1:
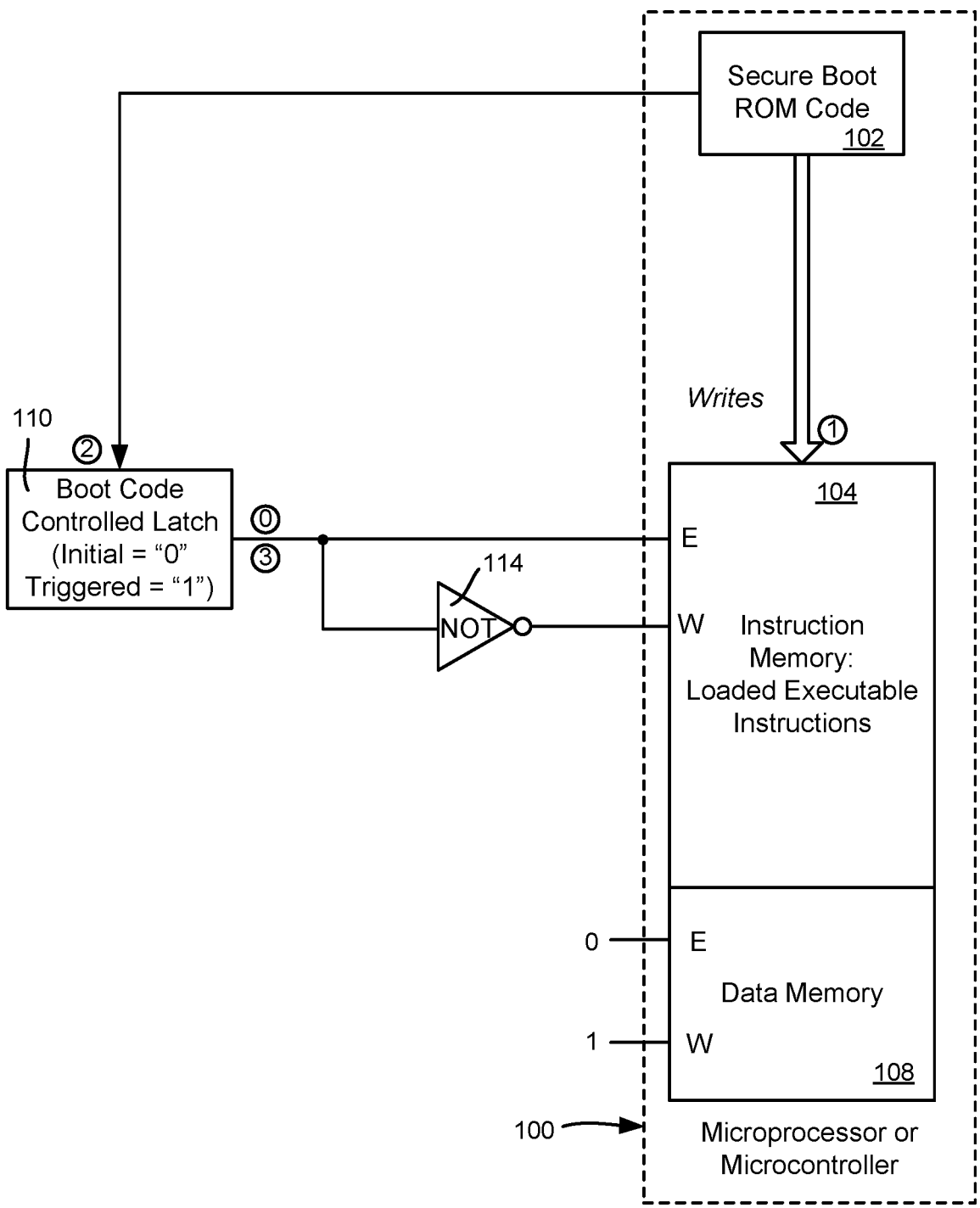
FIG. 1 is a block diagram representing an example computing device configured with hardware support and executable memory that is protected against code modification after boot, according to one or more example implementations.

FIG. 1 shows an example of a generalized conceptual diagram in which a microprocessor or microcontroller 100 contains secure boot code 102 that writes to instruction memory 104 (that is, memory that is capable of being configured for executing instructions) in an initial stage, represented by the arrow/state accompanied by circled numerals zero (0) and one (1). Note that in the example of FIG. 1, hardware support is provided, and the overall memory is configured into at least two sections, each section having independent Write and Execute control lines (where a "1" at the Write "W" or Executable "E" control line on the memory input means enabled, and a "0" means disabled in this example). Thus, the secure boot code 102 also may write to data memory 108, which as shown in FIG. 1 is always writeable but never executable. Further note that the boot code 102 and/or memory may be externally coupled to the microprocessor or microcontroller 100 rather than incorporated into it in alternative architectures.

During this instruction-writing stage of the boot operation, hardware support comprising logic (gating) may be used to determine the input to the control lines of the instruction memory 104. For example, logic gating in the form of a latch 110 or the like initially outputs a zero ("0"). Such a latch 110 may be secured in hardware. A hardware latch as used herein is any suitable device that initially starts with an output of "0," and may be controlled/programmed (including by software) to flip to output a "1." Once a latch outputs "1," it cannot be changed back to "0" by software. Only a reset of the chip can bring the latch back to output "0."

As can be seen in FIG. 1, in order to write to the memory sections 104 and 106, write needs to be enabled (the "W" control lines set to "1" in this example), which occurs because the output of the boot code controlled latch 110 is "0," which is changed to a "1" by the NOT gate 114, whereby the memory 104 is writeable. At the same time, the memory 104 is not executable, because the latch 110 is outputting a "0" to the Execute "E" control line of the memory 104. Note that the logic (or the same or similar effect) provided by the latch and gate(s) may be built into a memory protection unit, as described below with reference to FIG. 3.

When boot completes, or at least the part of the boot that is responsible for securely loading the microprocessor's or microcontroller's protected code, the secure boot code 102 flips the state of the boot-controlled latch 110 to output a "1" as represented by the arrow/state accompanied by circled numerals two (2) and three (3). As this time, Write is disabled (via a "0" from NOT gate 114 to the "W" control line on instruction memory 104. Further, the change to "1" at the output of the latch 110 makes the memory 104 now be executable. The boot code 102 passes execution flow to the memory 104.

In this example, once loaded, all of the executable memory is selected for being locked from further modification. Thus, the memory is protected from an attack that is based upon writing any new code to executable memory.

It should be noted that the secure boot code 102 may boot up one or more microprocessors and/or microcontrollers in this way. Alternatively, more than one set of secure boot code 102 may be provided, e.g., one for each microprocessor and/or microcontroller in a larger overall system.

Figure 2:
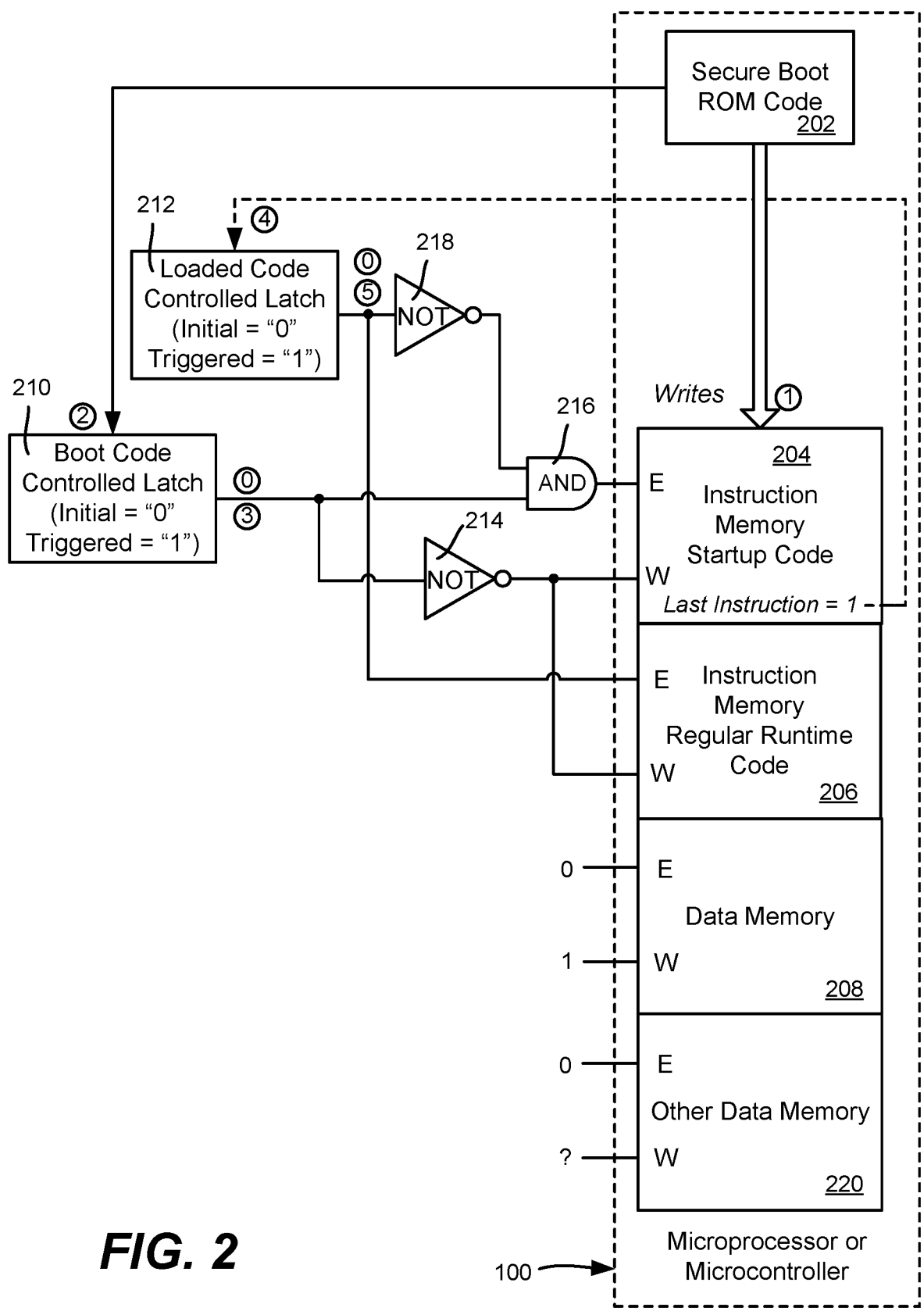
FIG. 2 is a block diagram representing an example computing device configured with hardware support and selected executable memory that is protected against code modification after boot, with part of the code becoming non-executable after execution is no longer needed for that part, according to one or more example implementations.

FIG. 2 shows an example of a generalized conceptual diagram in which a microprocessor or microcontroller 200 contains secure boot code 202 that writes to instruction memory 204 and 206 (that is, memory that is capable of being configured for executing instructions) in an initial stage, represented by the arrow/state accompanied by circled numerals zero (0) and one (1). Note that in the example of FIG. 2, hardware support is provided, and the overall memory is configured into at least three sections, each section having independent Write and Execute control lines (where a "1" at the Write "W" or Executable "E" control line on the memory input means enabled, and a "0" means disabled in this example). Thus, the secure boot code also may write to data memory 208, which as shown in FIG. 2 is always writeable but never executable. Further note that the boot code and/or memory may be externally coupled to the microprocessor or microcontroller 200 rather than incorporated into it in alternative architectures.

In one or more implementations, the boot code 202 writes startup code to one section of instruction memory 204 and regular (runtime) code to the other section of instruction memory 206. Note that in alternative implementations, at least some of the startup code may load at least some of the runtime code, however for purposes of simplicity the boot operation may be considered as loading the code into memory sections 204 and 206.

During this instruction-writing stage of the boot operation, hardware support comprising logic (gating) may be used to determine the input to the control lines of the instruction memory portions 204 and 206. For example, logic gating in the form of a latch 210 or the like initially outputs a zero ("0"), as does another latch 212 or the like. Such latches 210 and 212 may be secured in hardware.

As can be seen in FIG. 2, in order to write to the memory sections 204 and 206, write needs to be enabled (the "W" control lines set to "1" in this example), which occurs because the output of the boot code controlled latch 210 is "0," which is changed to a "1" by the NOT gate 214 whereby thus the memory sections 204 and 206 are writeable. At the same time, neither memory section 204 or 206 is executable, because the other latch 212 is outputting a "0" to the Execute "E" control line of the memory section 206, and because the AND gate 216 is outputting a "0" to the Execute "E" control line of the memory section 204 (because of the "0" output of the latch 210 coupled to the input of the AND gate 216).

When boot completes, or at least the part of the boot that is responsible for securely loading the microprocessor's or microcontroller's protected code, the secure boot code 202 flips the state of the boot-controlled latch 210 to output a "1" as represented by the arrow/state accompanied by circled numerals two (2) and three (3). As this time, Write is disabled (via a "0" from NOT gate 214 to the "W" control lines on instruction memory sections 204 and 206. Further, the change to "1" at the output of the latch 210 makes the AND gate 216 output a "1," whereby the instruction memory startup code in memory section 204 is now executable. The boot code 202 passes execution flow to the startup code in memory section 204.

The startup code in instruction memory section 204 in general includes any one-time setup instructions/instruction sequences that need to be protected from being executed by an attacker. For example, the startup code may configure another data memory region 220, including making such a section non-executable. An attacker may want to reconfigure this other memory 220 for malicious purposes by changing the configuration parameters and then jumping to the instruction sequence in the instruction memory section 204 that uses those parameters to perform the configuration. However, as will be understood, the startup code is only executable one time, and the only instruction sequence that performs the configuration is in the startup code.

Note that RoP (return oriented programming) based attacks are those in which a bug is exploited such that a called function returns to a different instruction instead of to the correct instruction that follows the instruction that called the function. When protecting against such an attack, it needs to be assumed by the developer that an attacker has the ability to change most registers and the stack, whereby the attacker can jump to any instruction. A RoP attack is typically used as a springboard to execute just the right amount of code to turn on execute permission for another piece of attacker-controlled memory. For example, an attacker can write registers and then jump to the instruction that uses those registers to set execute permissions for the memory containing the attacker-controlled code. After that, the attacker can jump to the attacker's code, which the attacker has given the proper permissions, and take control of the system by executing such code. RoP attacks are becoming commonplace and can be deployed on any CPU, including CPUs that have hardware no execute support. Further, even CPUs with hypervisor and/or supervisor modes, along with user mode, RoP attacks can take place. Thus, the technology described herein applies to CPUs with different privileges, modes and so forth.

To ensure the startup code can only be executed once, the last instruction of the startup code turns off its own ability to execute. In the example of FIG. 2, the last instruction flips the state of the latch 212 to output a "1" such that the NOT gate 218 outputs a "0" to the input of the AND gate 216, whereby the instruction memory section 204 that contains the startup code is no longer executable. This state change is indicated in FIG. 2 via the arrows/state labeled four (4) and five (5). The only way to change the state of the latch 212 is a cold reboot. Thus, if an attacker jumps to an instruction in the startup code, the instruction will not be executable, e.g., an exception will occur.

In the example of FIG. 2, during startup execution, the startup code loaded into instruction memory section 204 cannot be changed while it is in the executable state, because it is not writeable. Then, when execution of the startup code completes, the startup code can no longer be re-executed. Note that FIG. 2 suggests that following the last instruction in the startup code, the instruction pointer moves to the first instruction in the regular runtime code. If this is not possible given the memory and/or system architecture, then an instruction following the "last" instruction may be provided. When an attempt is made to execute such an instruction, an exception will occur; the exception handler (which may be in the runtime code) may be configured to recognize this planned exception as coming from the appropriate point in the startup code, and move the instruction pointer to the desired execution point, e.g., the start of the regular runtime code.

As with the example of FIG. 1, the secure boot code 202 may boot up one or more microprocessors and/or microcontrollers in this way. Alternatively, more than one set of secure boot code 202 may be provided, e.g., one for each microprocessor and/or microcontroller in a larger overall system.

Note that in the example of FIG. 2, the memory section 204 is neither writeable nor executable at the end of startup code execution; however it is straightforward to configure logic such that the memory section 204 may be made writeable but not executable after its initial execution and thus be reclaimed for use as additional data memory, for example. In other words, in the examples of FIGS. 1 and 2, all of the executable instructions are selected for being made non-writeable at the end of boot; however if the startup code is protected by being made non-executable once execution thereof is no longer needed, only the runtime code instructions need be selected as non-writeable instructions by protecting their memory space from writes.

Figure 3:
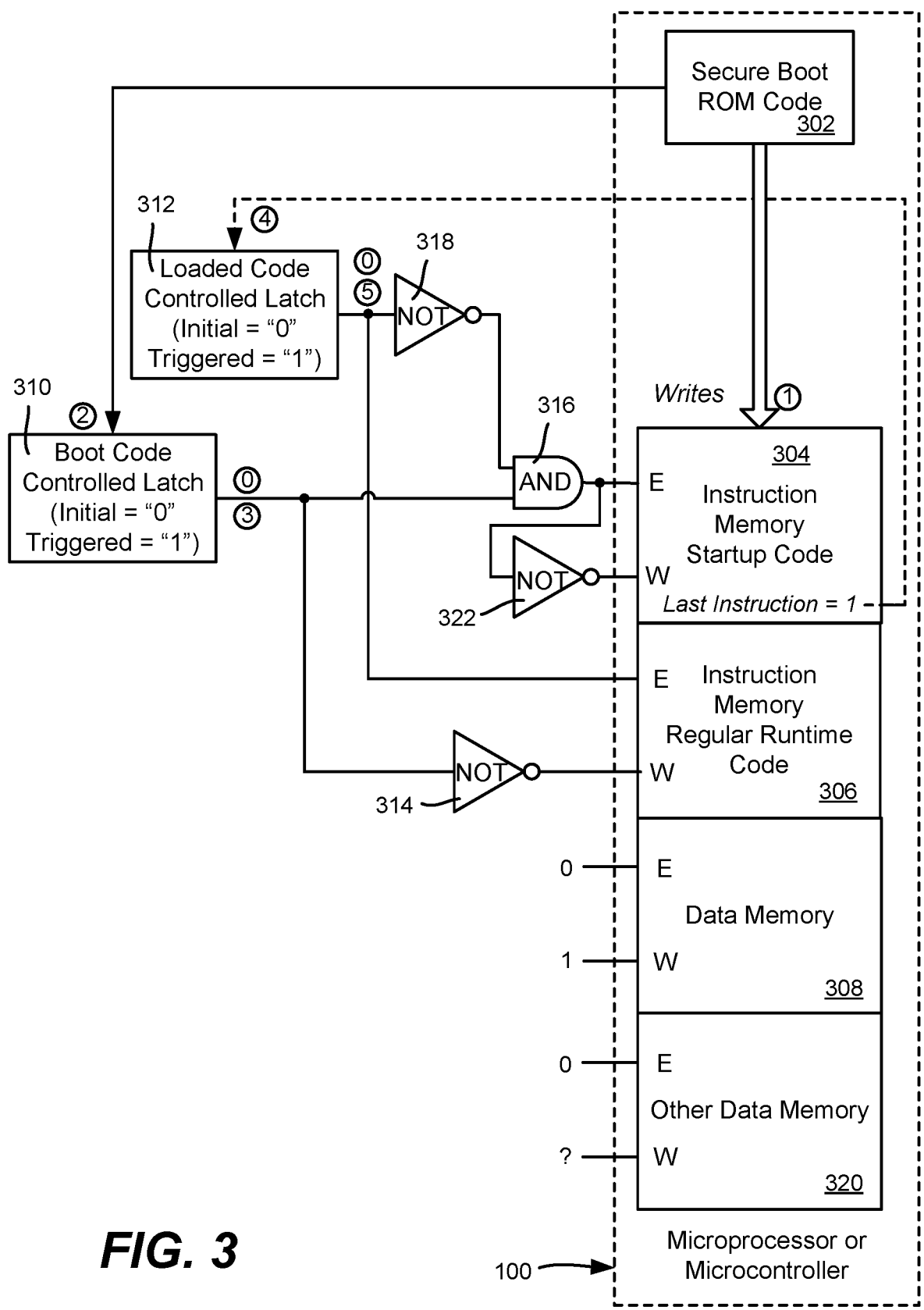
FIG. 3 is a block diagram representing an example computing device configured with hardware support in which selected executable memory is protected against code modification after boot, and non-selected executable memory becoming non-executable after execution is no longer needed for those instructions, according to one or more example implementations.

Thus, in one or more alternative implementations, one of which is generally exemplified in FIG. 3, the memory section 304 may be reclaimed for data reads and writes. To this end, the logic in FIG. 3 is generally similar to that of FIG. 2, except that when latch 312 gets flipped to output a "1," instead of shutting off both Execute and Write to section 204 as in FIG. 2, the Write line to section 304 in FIG. 3 is configured via NOT gate 322 to always be the opposite of the Execute line's state.

Thus, during boot, the Execute line of memory section 304 is low and the Write line is high, whereby memory section 304 is writeable. Once loaded and the latch 310 is flipped to output a "1," the AND gate 316 makes the memory section 304 executable, but not writeable via NOT gate 322. When the code-controlled latch 312 is flipped to output a "1," the NOT gate 318's output into AND gate 316 is low, whereby the memory section 304 is again non-executable and writeable.

Figure 4:
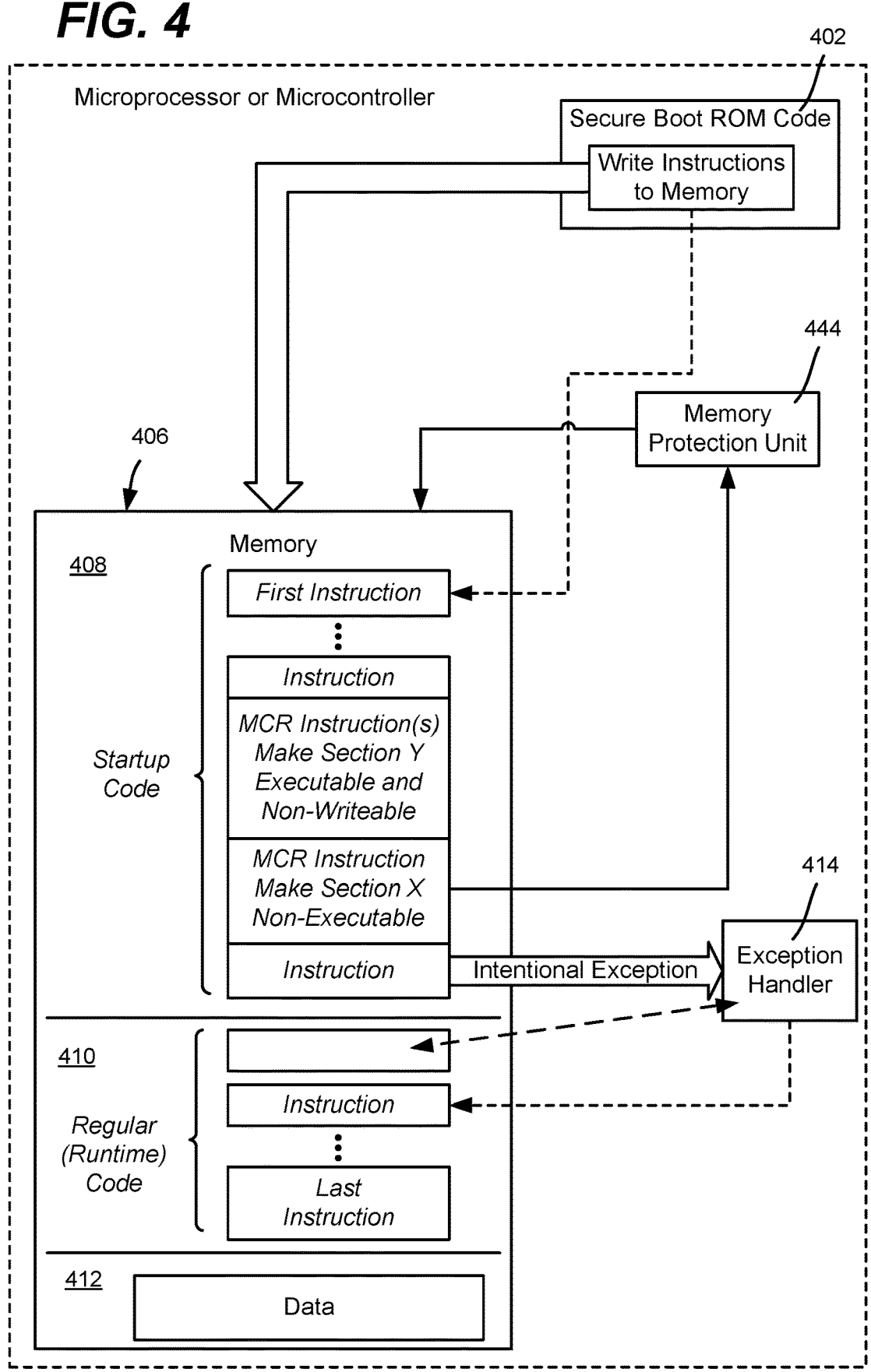
FIG. 4 is a representation of an example architecture including a memory protection unit that may be used to protect code, according to one or more example implementations.

FIG. 4 shows some of the above concepts exemplified in a system using an ARM R4 architecture with an ARM memory protection unit (MPU 444). Note that the technology described herein may be applied to other ARM microprocessors, as well as many other microprocessor architectures. In general, as long as the hardware supports a way to "lock" the memory that contains code and not allow any new code to be introduced and/or certain code to be re-executed, then the hardware can be arranged to achieve the protection described herein.

In FIG. 4, secure boot code 402 writes the desired instructions to memory 406; at this time, the memory 406 is not configured or protected at all, and can be written to or have instruction therein executed. However, while writing to the memory 406, the secure boot code 402 does not allow the instructions in the memory to execute, e.g., by having the secure boot code retain control of the execution flow until the desired loading is complete.

When the appropriate code to be protected is loaded, the secure boot code 402 transfers execution to the first instruction in the memory 406; note that the memory is executable and writeable at this time, as the memory protection unit 444 starts off in a disabled state. Note also that none of the memory is configured (that is, there are no separate regions) at this time. Indeed, in this example it is the responsibility of the startup code 408 to configure the memory 408 into various regions, each region having attributes as set by the startup code.

In general, the startup code sets up the memory 406 as desired by configuring the MPU 444, including by setting register values to set up a number of regions, e.g., 408, 410 and 412, each region with a configured size, starting (base) address location and attributes, including whether a given region is writeable and/or executable. For example, the configuration code may configure the memory so that the startup/memory code itself exists in one region 408 of the memory, and that the regular runtime code (that executes after startup) is loaded in another region 410 of the memory (which can execute, but is not writeable once the MPU 444 is enabled, for example). One or more data regions 412 also may be configured. When the registers are set up to configure the memory 406 as desired, the configuration code enables the MPU 444, through a particular MCR instruction with parameters in another register for this purpose.

The startup code is thus written so as to configure the registers (e.g., base, size and attribute registers) and region index that set up the memory protection for each region as desired, and then enable the MPU 444. For example, in the ARM R4 instruction set, an MCR (move to compressor) instruction is used to enable the MPU 444 based upon information in a general register ("MCR P15") that identifies that MPU 444 as the desired coprocessor to target.

Care is taken by the developer when writing the code sequence that (when executed) initially turns on the MPU 444. This is because the instruction used to enable the MPU also may be used to turn the MPU off, if a different value is loaded in an appropriate (general purpose) control register. Thus, this instruction is susceptible to an attack.

To protect the MPU configuration against an attack that later changes the register or registers so as to disable the MPU (or to reconfigure it), one solution described herein is to place the MCR instruction in a memory region that becomes not executable once the MPU is enabled. More particularly, during the execution of this code sequence, the MPU is enabled via the MCR instruction; the moment the MPU is enabled, the MPU makes the region (e.g., region 408) that contains this MCR instruction and any other instructions in that region non-executable. As a result of the now-enabled MPU 444, the MCR instruction itself and any other instructions in the region (including any following instruction in the region, which may be present depending on the memory layout) stops being executable. Assuming another instruction follows the enable instruction, that next instruction attempts to execute, but cannot because of the MPU 444 being enabled, whereby a "Prefetch Abort" exception is caused. The exception handling code 414 recognizes this scenario, e.g., via a program counter, and redirects execution towards the intended path, e.g., an instruction in executable region 410 in FIG. 4. Note that the exception handler needs to be in executable space, e.g., in the runtime space/region 410, and not in the space 408 that can no longer execute.

In general, the developer ensures that only region 408 contains any MCR instruction or instructions, and that region 408 retains control of the execution flow until the region 408 becomes non-executable, e.g., in the last substantive instruction. This is relatively straightforward for a developer to implement. In this way, for example, after the secure boot load, the MPU 444 may be configured to make the region 410 executable and non-writeable, and protect the MPU 444 from any further changes (until another boot session) by having only the region 408 contain the MCR instruction and making region 408 non-executable thereafter. It is assumed that an attacker can write various registers as desired and jump to any instruction in memory; however, in the scheme described herein, even if the attacker rewrites one or more registers and jumps to the MCR instruction location, the attacker is not able to execute the MCR enable/disable MPU instruction because it is in a memory region 408 that is now non-executable, and no other MCR enable/disable MPU instruction exists anywhere in any other executable code region. In this way, the MPU cannot be disabled or reconfigured.

Figure 5:
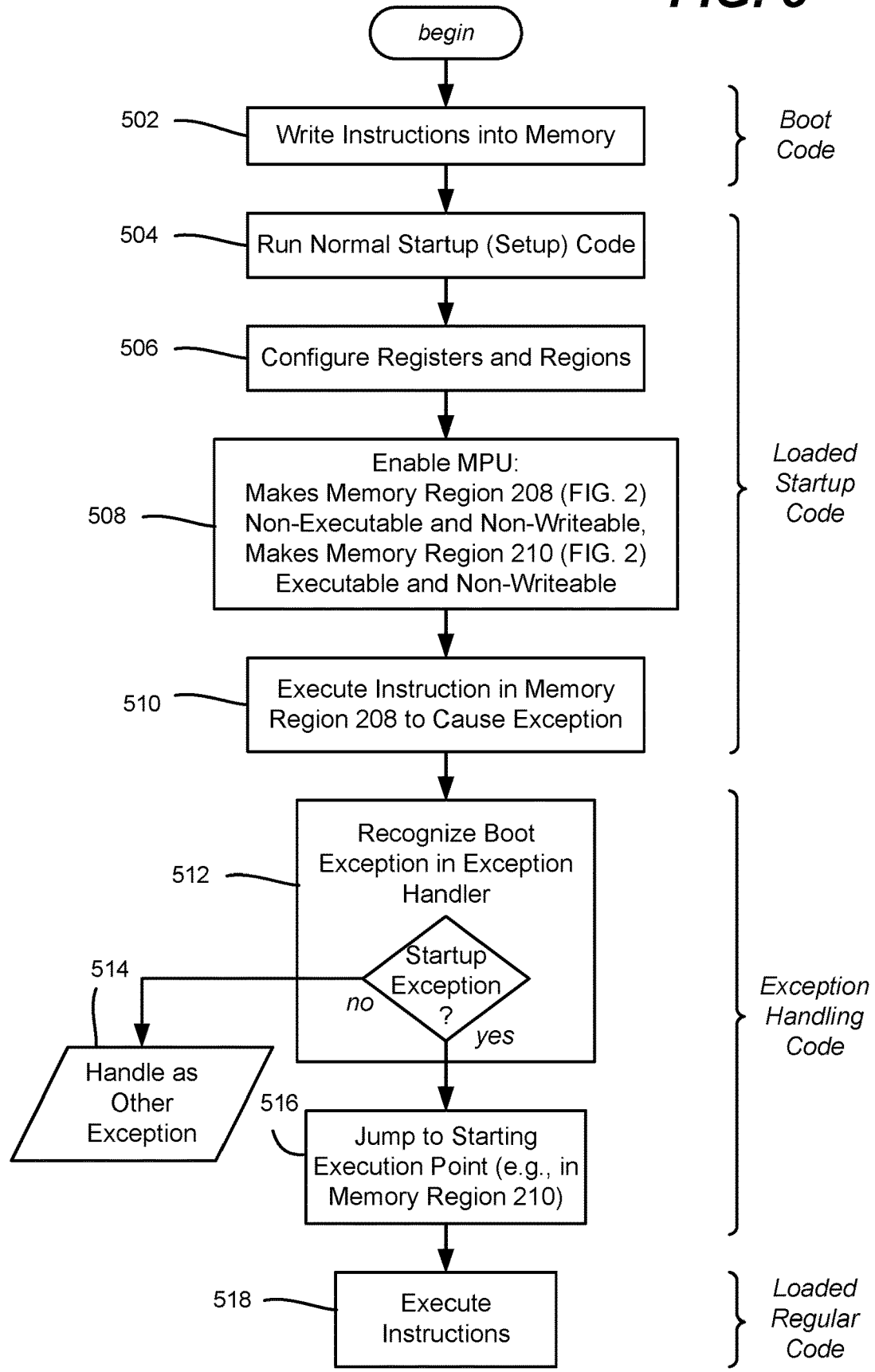
FIG. 5 is a flow diagram representing example steps that may be taken to protect code, according to one or more example implementations.

FIG. 5 is a flow diagram containing example steps that summarize the operation of the various components to protect the memory in an architecture with an MPU; it is straightforward to follow (at least most of) these steps for other architectures, including the hardware-supported architectures of FIGS. 1 and 2. Step 502 begins this example represents the boot code loading the memory with executable instructions. Step 504 begins running any normal (e.g., not directed towards code protection) startup code.

Step 506 running the portion of the startup code that is used to protect the memory, and represents configuring the MPU/registers such that the memory will be separated into the desired regions at the desired location, each region having the desired write/execute attributes. Step 508 enables the MPU to arrange and enforce these settings; in the example of FIG. 3, this makes the memory region 308 both non-executable and non-writeable, and makes the memory region 310 executable and non-writeable.

Step 510 executes an instruction, if needed, in the now non-executable memory region 308 to cause an exception. The exception handler represented by steps 512 and 514 determines at step 512 that this is a startup exception, (if not, step 514 would be executed to handle the exception in another way), whereby the exception handler branches to step 516 to jump to the next desired instruction, e.g., the starting point of the regular/runtime code. Step 518 represents executing these instructions.

As can be seen from the examples in FIGS. 1-5, memory containing selected protected instructions is writeable when needed for loading, and executable but not writeable thereafter. All loaded instructions may be selected for non-write protection, or in an alternative, only a proper subset containing the runtime instructions may be selected, with other instruction space (e.g., all or some of the startup code) being writeable but not executable, e.g., after one-time execution. This is because certain one-time executable code such as code needed to perform startup operations may be executed once and then made no longer executable. These operations may be by additional hardware support or via a microprocessor's/microcontroller's built-in or closely coupled memory protection unit.

While all of the startup code instructions may be protected by making them non-executable at an appropriate time, in some scenarios only part of the startup code instructions may need to be protected. For example, some of the startup code instructions may be arranged for one-time execution, but not cause any worse problems if re-executed because of an attack than would an attack on the runtime code. In some situations, it may be more efficient (e.g., it may save resources) to arrange memory such that only the memory reconfiguration code need be protected against re-execution, for example, and thus other portions of the startup code may remain executable, and/or have its instructions written over with more runtime code, or possibly data. Thus, as used herein, "protected startup code instructions" may be a proper subset of the startup code instructions, or may be the entire set of startup code instructions.

Figure 6:
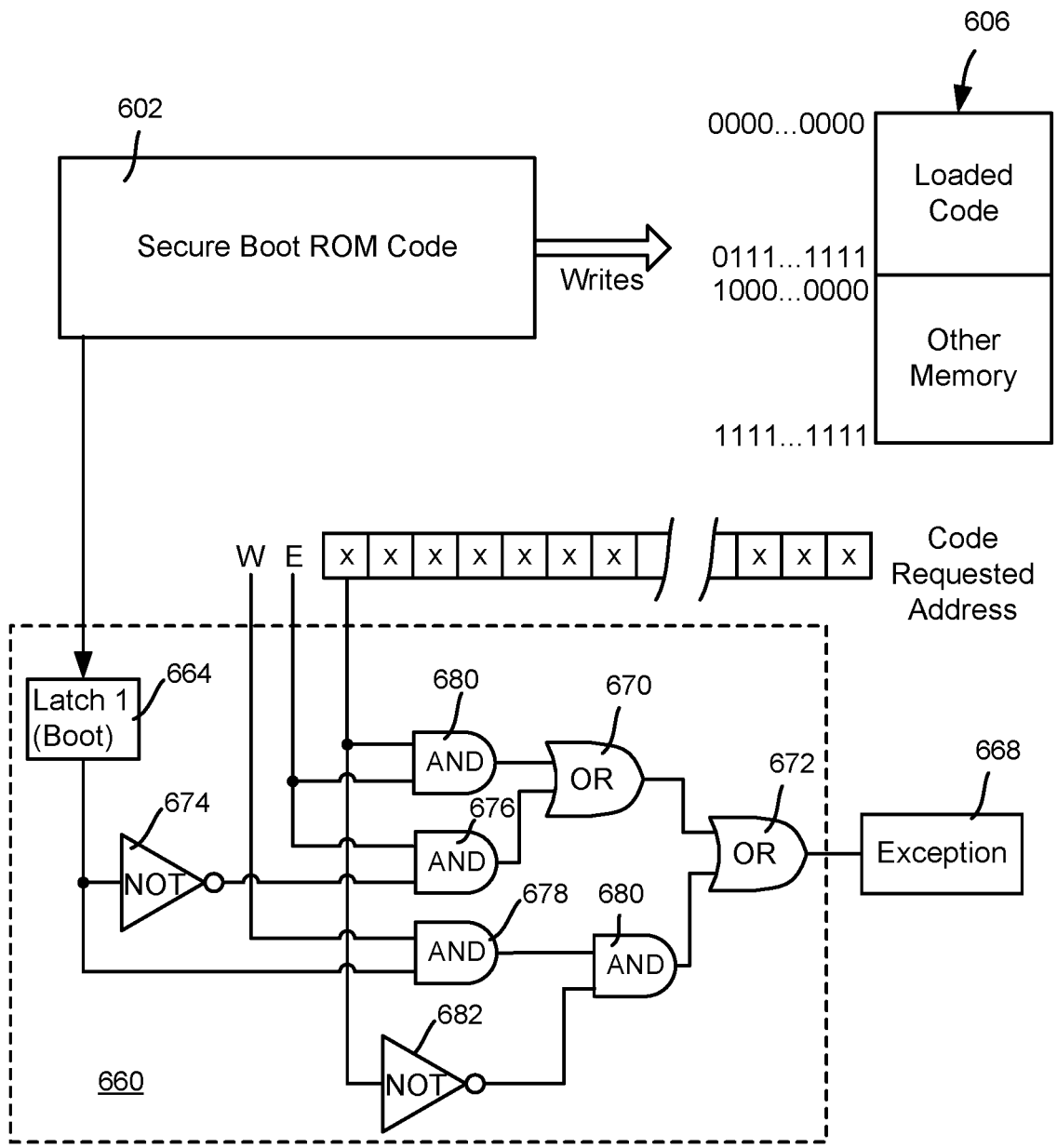
FIG. 6 is a representation of an example architecture including a hardware that may be used to protect code by generating exceptions based upon memory address access attempts and the boot state, according to one or more example implementations.

As can be readily appreciated, without an MPU, logic as in FIGS. 1-3 may be used to control the attributes of any portion of memory; in an alternative, the memory address lines along with the Write and Execute lines may be used to throw an exception, as generally represented in FIGS. 6, 7A and 7B. In general, and as will be understood, FIGS. 6, 7A and 7B show ways to implement what is basically a simple hardware based "MPU" using simple logic gates, e.g., if the CPU used does not support memory fences (as does the ARM R4 with MPUs does. Note that FIGS. 6, 7A and 7B do not distinguish between different types of exceptions, however as can be readily appreciated, instead of OR-ing exception throwing logic together, separate exceptions can be thrown.

In FIG. 6, a general goal is to allow the secure boot ROM code 602 to write to any memory space 0000 . . . 0000 to 1111 . . . 1111. At the same time, none of this memory space is executable during boot. Then, after boot, the memory space 0000 . . . 0000 to 1111 . . . 1111 is locked from further writes, but becomes executable.

To this end, after boot, a latch 664 is triggered, which "locks" the memory address space 0000 . . . 0000 to 0111 . . . 1111 to be non-writeable by throwing an exception 668 anytime this space is addressed with the Write line at "1." At the same time, this address space 0000 . . . 0000 to 0111 . . . 1111 becomes executable.

In the example of FIG. 6, any "1" on any OR gate 670 or 672 throws an exception 668. When the latch 664 is initially low, during code loading by the boot code, the NOT gate 674's output is "1" and thus an exception is thrown anytime the Execute line goes high during boot. The latch 674 also ensures that AND gate 678's output is low during boot, and thus that AND gate 680's output is low during boot, whereby a write to any address space may take place without cause an exception.

When the boot code flips the latch to output a "1," the address space 0000 . . . 0000 to 0111 . . . 1111 becomes executable, because the NOT gate 674's "0" output prevents AND gate 676 from ever outputting a "1" again (until the next cold boot, that is). Note that the memory address space 1000 . . . 0000 to 1111 . . . 1111 can never be executed without throwing an exception, because AND gate 680 will output a "1" anytime the Execute line is "1" and the high address bit is a "1."

After the latch is flipped to output a "1," writes to the address space 0000 . . . 0000 to 0111 . . . 1111 will cause an exception 668 because of the AND gate 678 outputting a "1" to AND gate 680 during any write; if the high bit on address line is "0" at that time, the NOT gate 682 outputs a "1" as the other input to the AND gate 680, which then outputs a "1." Writes will continue to be allowed to address space 1000 . . . 0000 to 1111 . . . 1111, because the NOT gate 682 outputs a zero to the AND gate 680.

Figure 7:
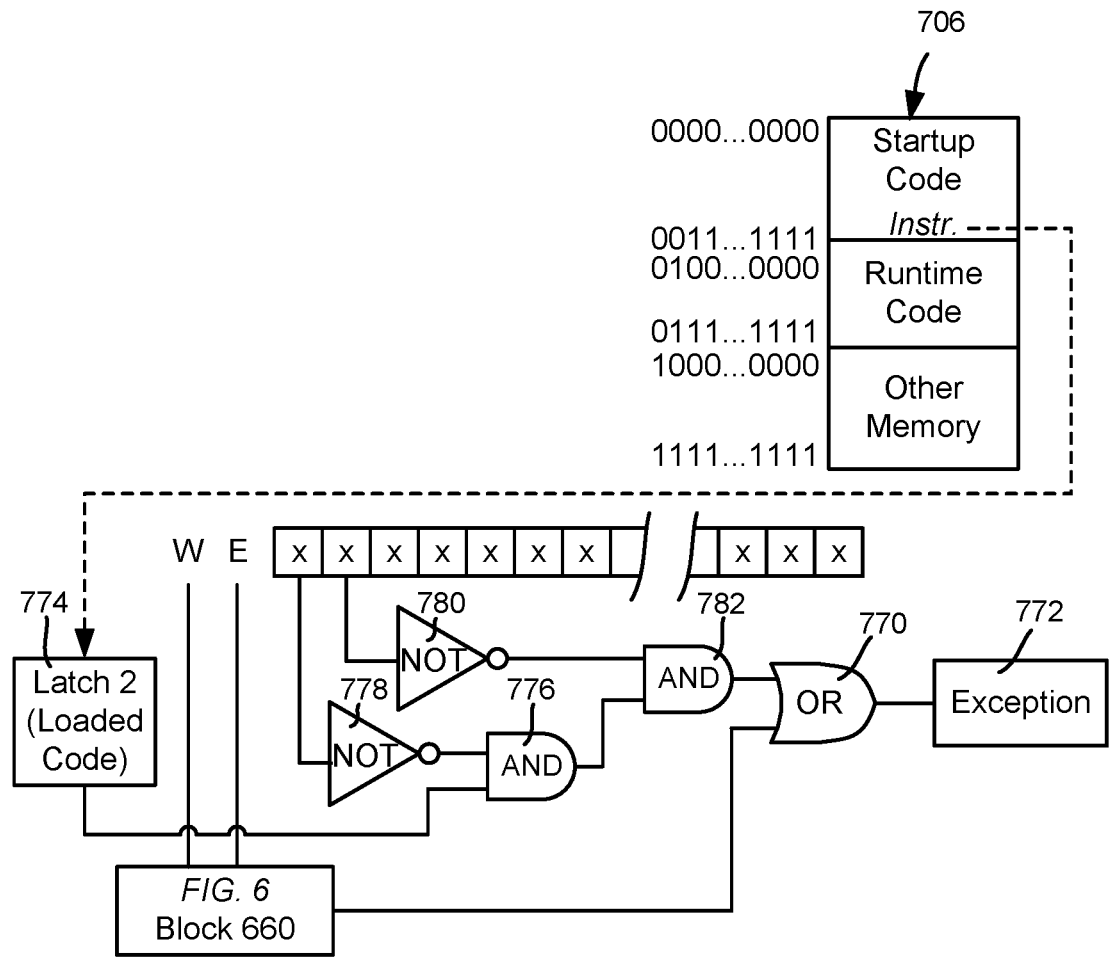
FIG. 7 is a representation of an example architecture including a hardware that may be used to protect code by generating startup code and runtime code memory access exceptions based upon memory addresses and the boot state, according to one or more example implementations.

FIG. 7 shows a configuration that further differentiates between Startup code that becomes non-executable at the end of its instructions. Note that the logic within the dashed block labeled block 660 in FIG. 6 may be reused in FIG. 7. Thus, via OR gate 770, an exception 772 occurs in FIG. 7 anytime it would occur in FIG. 6.

In FIG. 7, the memory space 0000 . . . 0000 to 0111 . . . 1111 is further separated into two spaces, one for startup code instructions and one for runtime code instructions by the next highest address bit. That is, address space 0000 . . . 0000 to 0011 . . . 1111 is for the startup code, and address space 0100 . . . 0000 to 0111 . . . 1111 is for the runtime code.

As can be seen in FIG. 7, the last startup code instruction flips another latch 774 to output a "1" and thus make AND gate 776 output a "1" anytime the highest address bit is "0" (because of NOT gate 778). Via NOT gate 780 and AND gate 782, this triggers an exception if the highest two address bits are "00" any time after the latch is flipped, meaning this space is locked from any further access.

Figure 8:
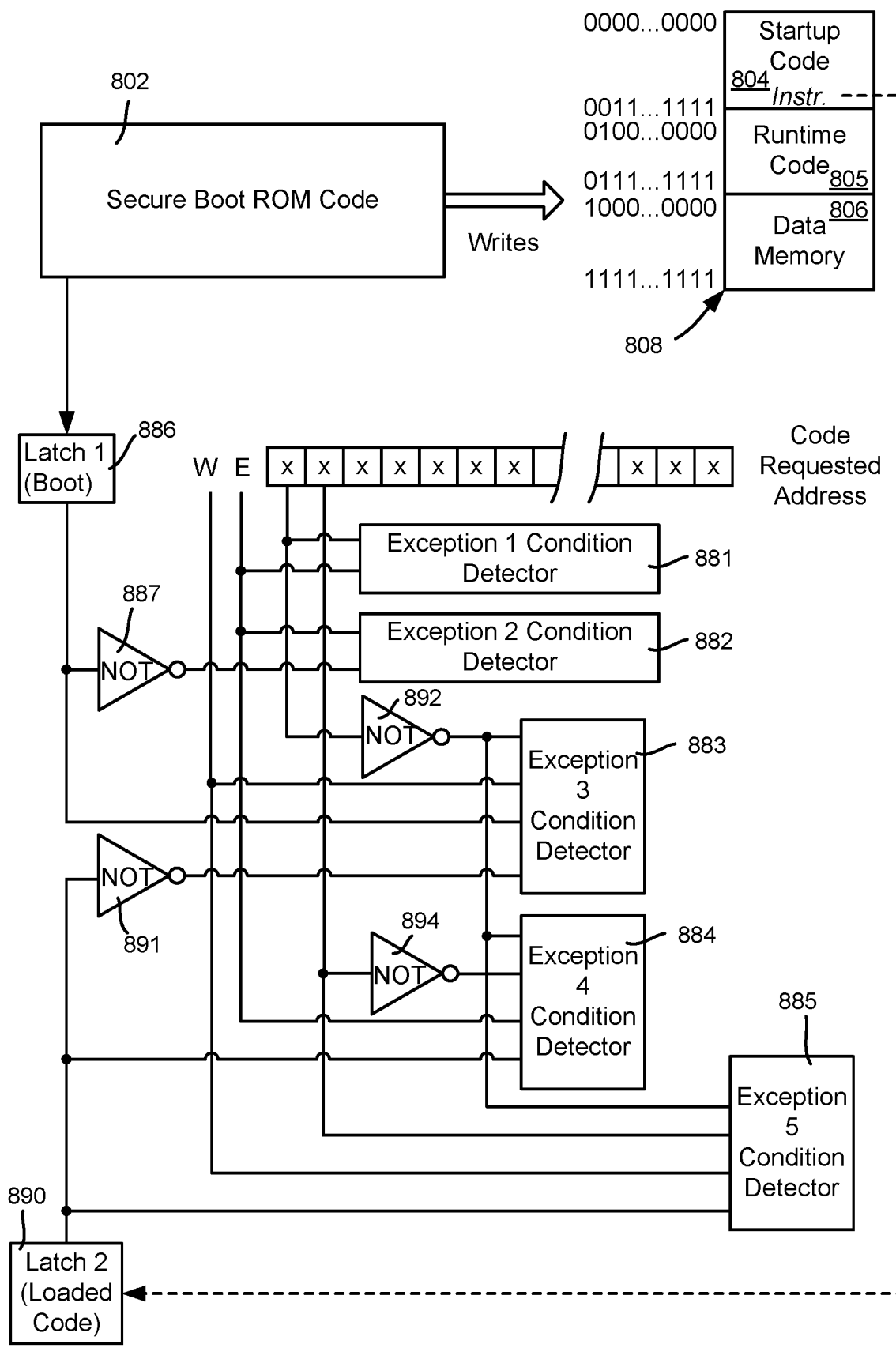
FIG. 8 is a representation of an example architecture including a hardware that may be used to protect code by generating startup code and runtime code memory access exceptions based upon memory addresses, the boot state, and the execution state of the startup code, according to one or more example implementations.

As can be readily appreciated, similar logic applied to other than the most significant bits may be used, so that the startup code may consume only a relatively small portion of the memory, which then becomes non-accessible at completion of startup. Further, logic may be used that makes an address space Similar to FIG. 7, FIG. 8 shows how logic may be used to make a space (or spaces 804-806) of memory 808 addressable for writes but not for execution during one stage, e.g., boot, and sometime after the writing of the code to that section is completed, to make that space of memory addressable for execution but not writes in a second stage (e.g., startup). However, unlike FIG. 7, FIG. 8 allows the memory space 804 used for the startup code to again become writeable but not executable at the completion of startup. For purposes of clarity, five "exception conditions" are shown and described (rather than showing the individual AND gates that detect the conditions), however as will be understood, whenever all input lines to any exception condition detector 881-885 in FIG. 8 are "1," an exception occurs.

As can be appreciated, the logic of FIG. 8 is arranged with an exception condition detector 881 whenever 1) an attempt is made to execute anywhere in the data memory space 806, which in this example is 1000 . . . 0000 to 1111 . . . 1111, that is, any address having the highest bit equal to "1." This condition 881 in the example of FIG. 8 is detected by inputting the Execute line and the highest address bit line into the exception condition detector 881 (which may simply contain a single AND gate). When both are "1" an exception is thrown.

Further, an exception is thrown 2) whenever the boot code 802 is loading (writing) to any memory space 808 and an execute attempt occurs. This is accomplished in the example of FIG. 8 because during boot loading, the boot latch 886 is outputting "0" at this time, which is inverted into a "1" via the NOT gate 887, which in turn is fed as input (for AND-ing) with the Execute line into exception condition detector 882.

Another exception condition is detected 3) whenever an attempt is made to write to any executable space 804 or 805 (0000 . . . 0000 to 0111 . . . 1111, that is, the highest address bit is "0") after loading is complete (the boot-controlled latch 886 flips to output a "1") but before the startup code has completed its one time execution (startup-controlled latch 890 is outputting a "0" which the NOT gate 891 inverts to "1"). The Write line, the inverse (from NOT gate 892) of the highest address bit, the state of latch 886 and the inverse of the state of latch 890 are fed to the exception condition detector 883 (where they are AND-ed together) to throw an exception when all four inputs are a "1."

Other exception conditions exist after the startup code completes and flips the code-controlled latch 890 to output a "1." In the example of FIG. 8, two other exception conditions need to be detected in this state. Note that in this particular example, the startup code space 804 (0000 . . . 0000 to 0011 . . . 1111, that is, the two highest address bits are "00") may be reclaimed for writes, but 4) need to cause an exception when any execute attempt in this space 804 occurs after the startup code completes. Another exception after startup completion in this example is based upon allowing the runtime code space 804 (0100 . . . 0000 to 0111 . . . 1111, that is, the two highest address bits are "01") to remain executable, but 5) cause an exception if write is attempted. Exceptions thus need to be thrown in either situation 4) or 5).

Thus, to cover exception condition 4), the Execute line, the inverted two highest address bits (inverted from "00" to "11") and the code-controlled latch 890's output (now "1") are the inputs to the exception condition detector 884 (for AND-ing together). Thus, in this example of FIG. 8, in the post-setup code state, writes are allowed to the reclaimed (former startup code) memory space 804, but no execution attempt can occur to the memory space 804.

To cover exception condition 5), the Write line, the code-controlled latch 890's output (now "1"), and the two highest address bits when addressing the runtime space 805 "01" (converted to a "11" by the NOT gate 894 inverting the highest address bit) are the inputs to the exception condition detector 885 (for AND-ing) together.

While many types of microprocessors and microcontrollers do not need to change their setup after boot, it is possible that in some situations, some portion of the memory may need reconfiguration. For example, in the ARM R4 architecture, regions are in a priority ordering, and sub-regions of a memory region may be further controlled by a bitmask, which can be manipulated via MPU reconfiguration. As a more particular example, tools exist that can analyze code and determine what memory a portion of code actually needs and what memory is not needed; additional protection against attacks may be implemented by masking off unneeded memory from access (including read/write or execution) by any given portion of code that is about to execute. Access may be restored when that portion of code completes, again by reconfiguration.

However, allowing the MPU to be reconfigured during runtime (which also needs an MCR P15 instruction or equivalent) is generally counter to the concept of protecting against attacks by turning off the startup code that only allowed the MPU to be initially, one-time configured. At the same time, the extra protection available via the sub-region bitmask reconfiguration is a tradeoff that in some scenarios is worthwhile for a developer to make.

Thus, in such scenarios reconfiguration is allowed, but only via a carefully written MPU-change function that may be provided in the executable instruction memory. In general, the function is written to detect and thwart an attack if one exists, or otherwise perform the reconfiguration and then protect itself against a future attack when its operations are complete. More than one such function may be present in a given set of runtime code.

Figure 9:
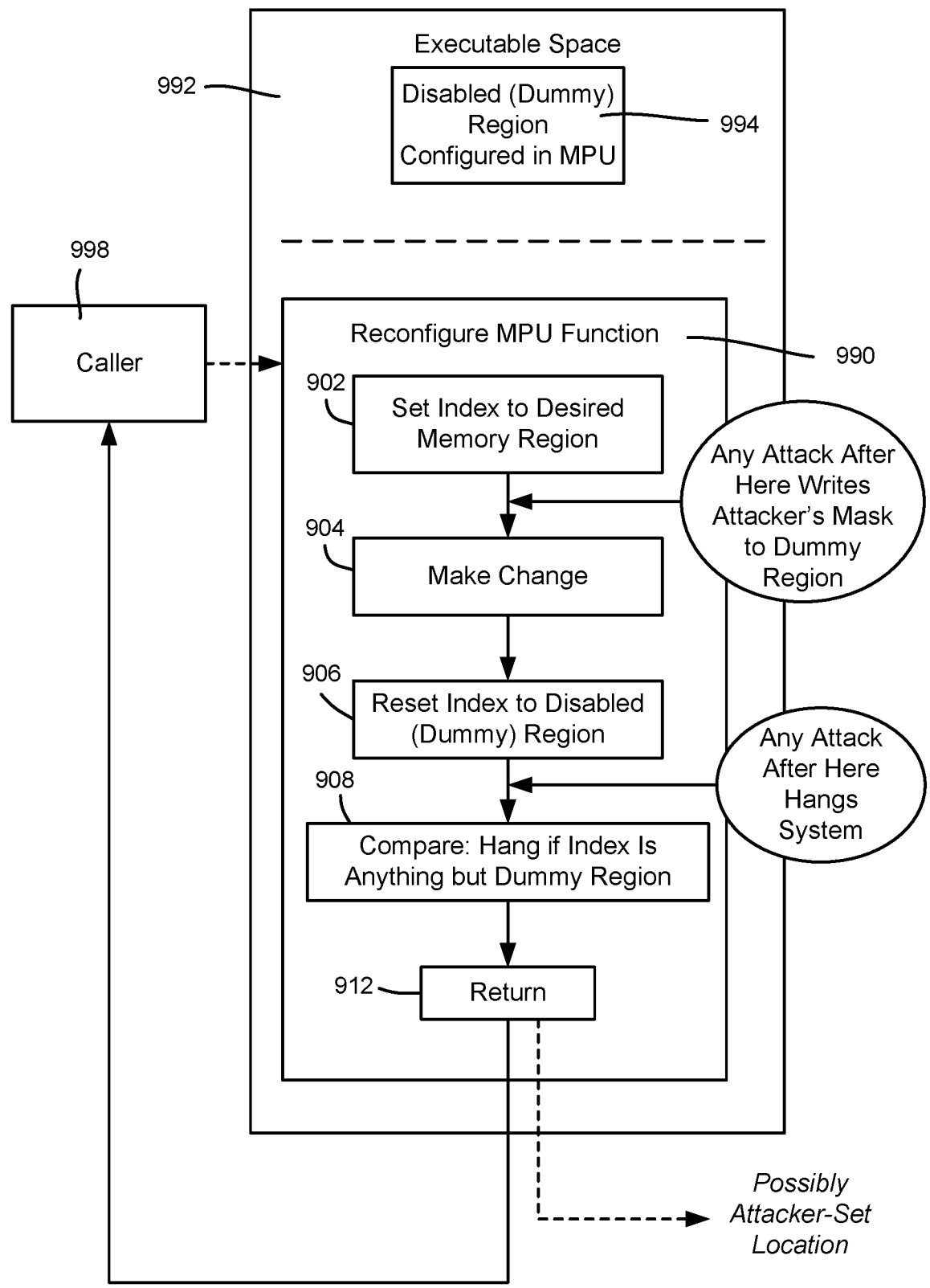
FIG. 9 is an example representation of a function that allows for runtime reconfiguration of memory sub-regions, according to one or more example implementations.

Thus, consider that a given scenario exists that needs to reconfigure the MPU/memory at runtime rather than only to initially one-time configure the MPU/memory. Such a reconfiguration may rewrite a few configuration bits, but only in a well-defined matter. To protect against a RoP attack in an example ARM-based implementation, as generally represented in FIG. 9, a function 990 is provided in executable space 992 (in any non-writeable, executable memory region) that performs a read-modify-write of particular bits of the MPU configuration, but thereafter protects against a RoP attack.

RoP allows an attacker to use the end of a function for malicious goals, and can jump into any instruction in the function, but it does not allow the attacker to prevent the rest of the function from executing before the return instruction. In the particular case of the R4 implementation, configuration of the individual MPU regions operates by setting a register to the index of a memory region to change, and then reading or writing a second register with the intended configuration, e.g., location, size, attributes (read/write or execute, or both).

To protect against a RoP attack but still allow some limited reconfiguration, a single MPU protected memory region may be configured, such as during the initial MPU configuration, as a "dummy" (disabled) region 994. During regular code execution, before the MPU configuration manipulation function 990 is called (by caller 998) to perform any memory reconfiguration as desired, the index corresponds to this dummy region 994.

When called, in general, the function 990 changes the index at step 902 to the appropriate region to change, e.g., passed in an argument Arg1. Note that if the attacker jumps to any instruction past step 902, then the attacker can only write bits that reconfigure the dummy region's bitmask, which is harmless. Thus, the only attack remaining is to try and change the index to the dummy region to an actual region. Note that the example steps of FIG. 9 only depict certain operations related to protecting against the RoP attack; additional details including example intervening steps are described with reference to FIG. 10.

Step 904 represents making the change for the desired region, (or if an attacker jumped over step 902, to the dummy region 994). Thus, an attacker cannot write to anything except the correct region with the correct bitmask (which effectively is not really an attack), or write bits to the dummy region 994. Step 906 represents resetting the index to the dummy region 994, (e.g., region 0).

At this point, the only attack the attacker can make is to change the index to something other than the dummy region 994 so that a subsequent jump (somewhere after step 902) can write bits somewhere else. However, step 908 determines whether an attack is occurring at this point by evaluating whether the index is still set to the dummy (e.g., zero) region. If the attacker has changed the region to anything but the dummy region, then the processor hangs, for example.

Figure 10:
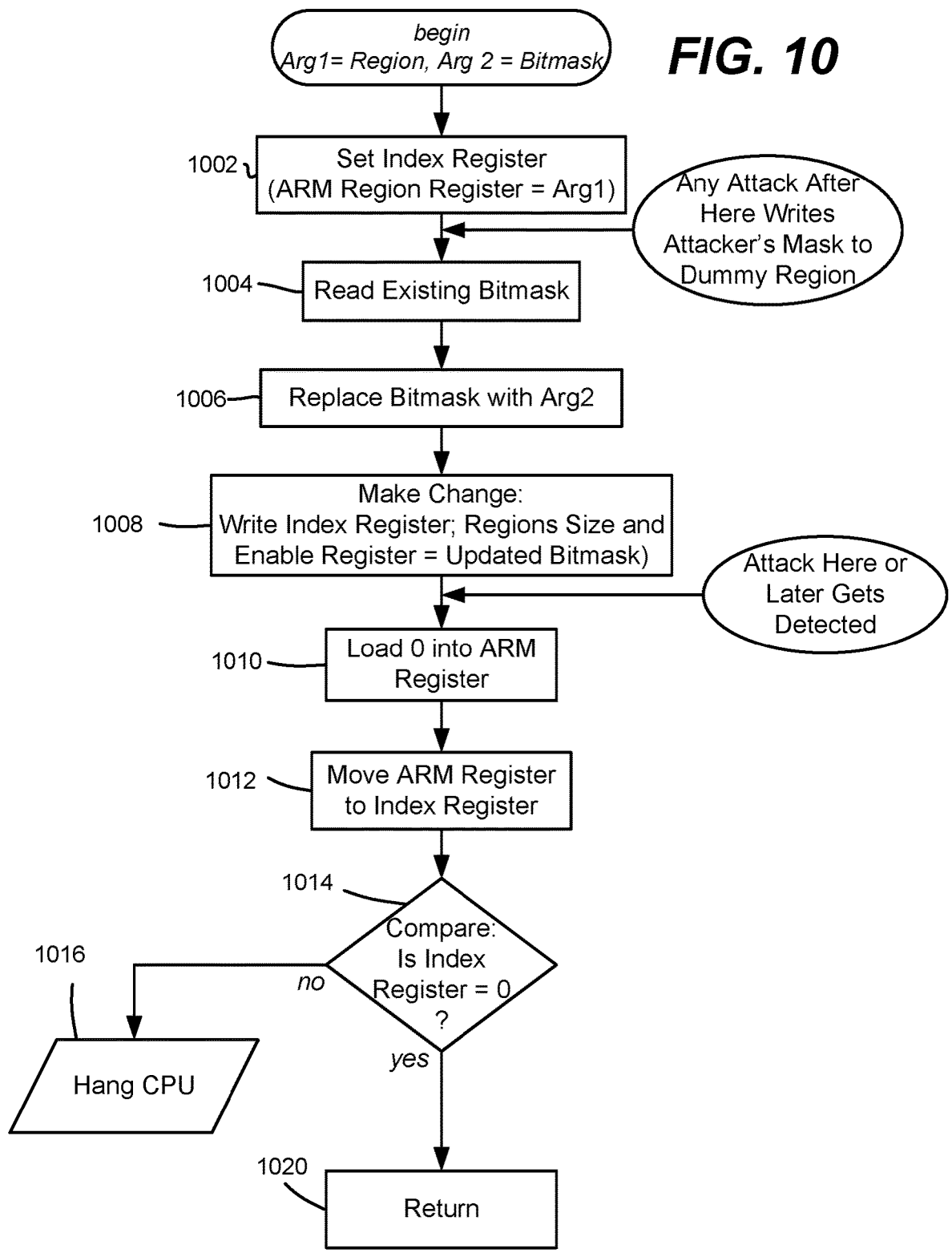
FIG. 10 is a flow diagram showing example steps that may be taken to protect a memory sub-region reconfiguration function against attacks, according to one or more example implementations.

FIG. 10 shows example logic/steps of the function 90 of FIG. 9 in more detail. Step 1002 sets the index register to the desired region, as passed via the argument Arg1. Note that jumping to any instruction after this point results in the index remaining at the dummy region. Step 1004 reads the existing bitmask.

Step 1006 replaces the bitmask with the new bitmask passed in argument Arg2, (or if an attack to the attacker's bitmask, but this will only change the dummy region's bitmask). Step 1008 makes the requested change.

At this time, the index needs to be reset to the dummy region in anticipation of a possible future attack. Step 1010 loads the dummy region value (e.g., a zero) into the ARM register, and step 1012 moves the ARM register to the index register. Note that two steps are needed to change the index, including loading the value into an ARM register, and then moving the value from the ARM register into the coprocessor register. The value cannot be put into the coprocessor register directly.

Step 1014 ensures that the attacker has not changed the index to the dummy region to the attacker's own register settings. If anything other than the dummy index value, e.g., "0" in FIG. 10, then step 1014 hangs the processor (step 1016). If unchanged, step 1020 then returns to the caller (or possibly to an attacker's location).

As can be seen, the function is written such that at the end of the function, (before any possible way to execute the return instruction at step 1020, including via any branch or jump instruction that may exist in a more complex function), the index is set back to the dummy region. Any number of such reconfiguration functions may exist, but a general rule for the developer is that no function (or instruction sequence) can exist that writes the index register without restoring the index to the dummy region afterwards (and after checking). If this rule is followed, if RoP is used in an attempt to abuse the tail of the read-modify-write function to write arbitrary data, only the disabled dummy region can be affected.

In this way, microprocessor or microcontroller startup code controls the setup of which range or ranges of memory contain executable code in such a way that no new code can be added to the system, even if the system has been compromised. The only way to add new code to a system that has been configured like this is to cold reboot the system and run new boot code. But by also deploying secure boot mechanisms that require the new code to be correctly signed, the attacker cannot change the boot code to contain the desired attack code, thus making it virtually impossible to implant new attack code into such a system.

Further, a RoP attack that can jump to any arbitrary instruction cannot reconfigure the memory, but only hang the system (which a RoP attack can do in any event). Note that the technology described herein does not prevent a RoP attack from taking place, but rather prevents a RoP attack from implanting new code into the system.

Aspects of the technology are based upon not allowing post-setup execution of the code containing the instructions needed to disable no execute memory protection, or the instructions needed to add new regions of memory that may contain code. By doing so, even when an attacker exploits a vulnerability to perform a RoP attack on the system, the attacker cannot leverage any existing code snippet to turn off no execution control, or add any of attacker code into the system as executable code. A cold reboot (with updated boot code) can be the only means to change the code loaded into the microprocessor or microcontroller.

Aspects of the technology include running secure boot code to load executable instructions into a memory space as loaded executable instructions, and protecting selected executable instructions by preventing further modification of the memory space that contains the selected executable instructions. Protection includes changing hardware logic to a state that prevents writing to any of the memory space that that contains the selected executable instructions.

Protecting the selected executable instructions may comprises preventing further modification to the memory space that contains all of the loaded executable instructions. Protection may include protecting some subset of the executable instructions, including any non-selected executable instructions, by preventing further execution of the subset of executable instructions.

Changing the hardware logic to a state that prevents further writing to any of the memory space that that contains the selected executable instructions may comprise configuring a memory protection unit with one or more regions that contain the selected executable instructions. This includes configuring the one or more regions that contain the selected executable instructions as non-writeable, and enabling the memory protection unit.

The memory space may comprise a first memory space containing startup code and a second memory space containing runtime code, in which the runtime code comprises the selected executable instructions. The startup code is executed, and at or near the end of executing the startup code, the startup code is protected by preventing further execution thereof. The runtime code may then be executed, for example. Protecting the startup code by preventing further execution thereof may include configuring a memory protection unit with one or more regions that contain at least the protected startup code instructions, and making those regions non-executable by setting attribute(s) and enabling the memory protection unit. Protecting the startup code by preventing further execution thereof may include making the first memory space non-executable, and thereafter generating a planned exception by attempting to execute an instruction in the first memory space. The planned exception causes an exception handler to transfer code execution to the runtime code.

The runtime code may be made unable to reconfigure memory space or memory attributes. Alternatively, the runtime code may be made unable to reconfigure memory space or memory attributes except via one or more functions that each includes protection against a return oriented programming (RoP) attack.

Aspects may include a microcontroller or microprocessor, a memory, and a hardware component, in which the hardware component is configured to protect selected executable memory from write access after being loaded during a secure boot operation, including by being configured to change the state of the selected executable memory to non-writeable after code is loaded into the selected executable memory (until another boot operation).

The selected executable memory may correspond to all executable instructions, or a subset of the executable instructions, e.g., runtime instructions. The hardware component may be further configured to protect a portion of executable memory from executing again once execution of code in the portion has completed, e.g., startup instructions.

The hardware component may comprise a memory protection unit configured to provide different memory regions, and for each memory region, to enforce attributes on that region including a write attribute that determines whether write access is allowed and an execute attribute that determines whether data corresponding to instructions in that region are executable. Executable startup code may be in a startup memory region that configures and enables the memory protection unit, including configuring it to prevent further execution of the startup code.

At least one region may be an indexed region that is associated with a sub-region bitmask. The executable memory contains executable runtime code, and may including a function that allows changing of the sub-region bitmask for the indexed region; the function resets the indexed region to a disabled region before the function returns to a caller.

Aspects are directed towards writing instructions into memory space in a secure boot operation, and configuring the memory space into a plurality of regions. Each region has a write attribute that determines whether write access is allowed in that region and an execute attribute that determines whether data corresponding to instructions in that region are executable. Configuring the memory regions includes, after the secure boot operation, protecting at least one region corresponding to selected executable instructions by configuring the at least one region as executable and non-writable. Protecting the at least one region corresponding to selected executable instructions may include locking each region that contains executable code loading during the boot operation from any further writes, including by configuring each region that contains executable code as executable and non-writable.

A first set of one or more regions may comprise startup code, and a second set of one or more regions may comprise runtime code. Protecting the at least one region corresponding to selected executable instructions may comprise configuring the first set as non-executable after executing at least some of the startup code, including startup code that configures the memory, and configuring the second set as executable and non-writable.

The runtime code may include a function. The function may a) set an index and change the configuration of a sub-region of the runtime region based upon the index, and b) and after changing the configuration, change the index to correspond to a dummy region before returning from the function.

Example Operating Environment

It can be readily appreciated that the above-described implementation and its alternatives may be implemented as a (e.g., dedicated) microprocessor or microcontroller on any suitable computing device/machine or similar machine logic, including a gaming and/or entertainment system/console, personal (e.g., laptop or desktop) computer, tablet, wearable computing device, appliance (e.g., television, DVR, set-top box), smartphone, standalone device and/or the like. Combinations of such devices are also feasible when multiple such devices are linked together. For purposes of description, a gaming (including media) system is described as one example operating environment hereinafter. However, it is understood that any or all of the components or the like described herein may be implemented in devices as executable code, and/or in hardware/hardware logic, whether local in one or more closely coupled devices or remote (e.g., in the cloud), or a combination of local and remote components, and so on.

Figure 11:
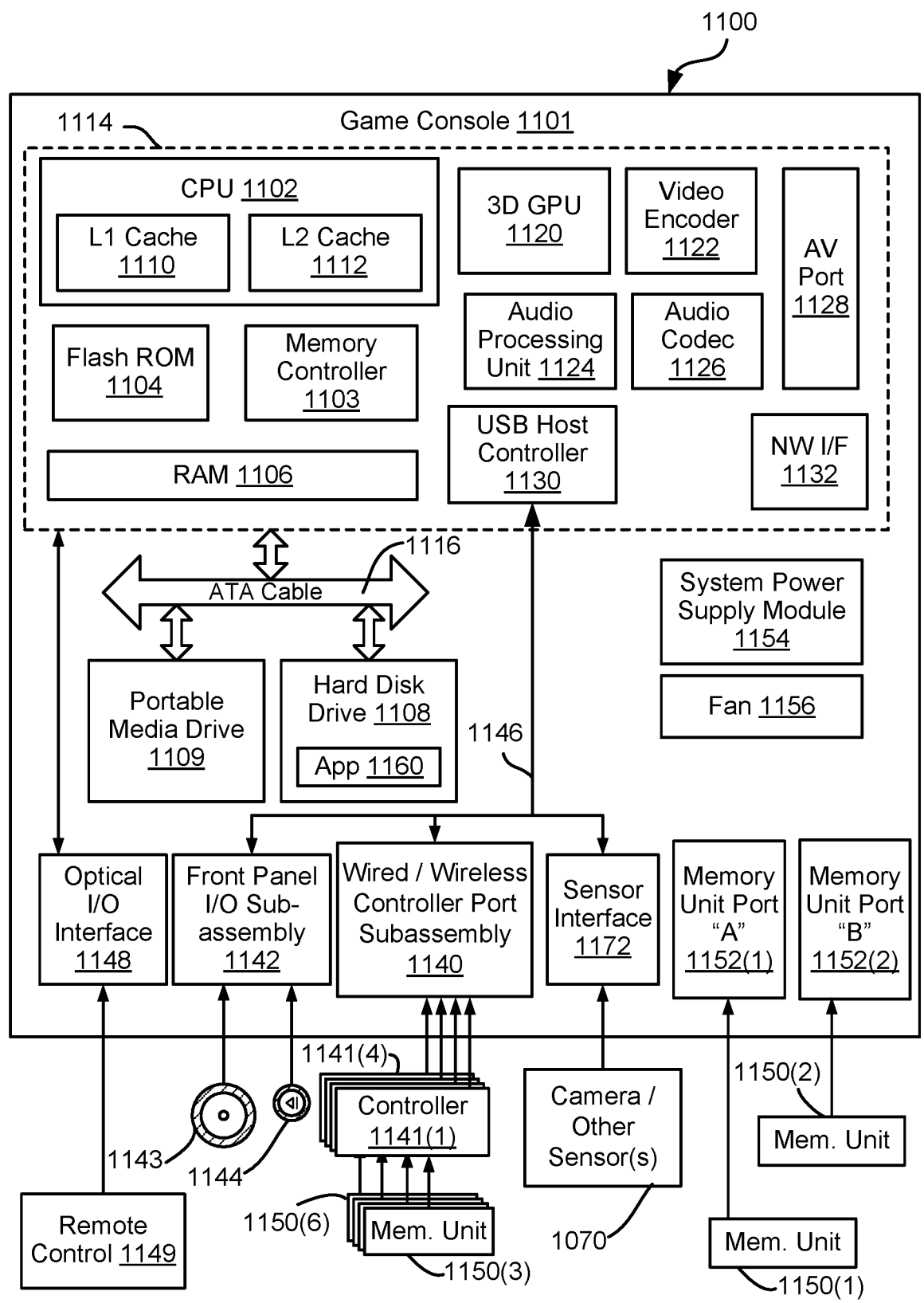
FIG. 11 is a block diagram representing an example non-limiting computing system and/or operating environment, exemplified as a gaming console, in which one or more aspects of various embodiments described herein can be implemented.

FIG. 11 is a functional block diagram of an example gaming and media system 1100 and shows functional components in more detail. Console 1101 has a central processing unit (CPU) 1102, and a memory controller 1103 that facilitates processor access to various types of memory, including a flash Read Only Memory (ROM) 1104, a Random Access Memory (RAM) 1106, a hard disk drive 1108, and portable media drive 1109. In one implementation, the CPU 1102 includes a level 1 cache 1110, and a level 2 cache 1112 to temporarily store data and hence reduce the number of memory access cycles made to the hard drive, thereby improving processing speed and throughput.

The CPU 1102, the memory controller 1103, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1102, the memory controller 1103, the ROM 1104, and the RAM 1106 are integrated onto a common module 1114. In this implementation, the ROM 1104 is configured as a flash ROM that is connected to the memory controller 1103 via a Peripheral Component Interconnect (PCI) bus or the like and a ROM bus or the like (neither of which are shown). The RAM 1106 may be configured as multiple Double Data Rate Synchronous Dynamic RAM (DDR SDRAM) modules that are independently controlled by the memory controller 1103 via separate buses (not shown). The hard disk drive 1108 and the portable media drive 1109 are shown connected to the memory controller 1103 via the PCI bus and an AT Attachment (ATA) bus 1116. However, in other implementations, dedicated data bus structures of different types can also be applied in the alternative.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus (not shown). An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link (not shown). The video and audio processing pipelines output data to an A/V (audio/video) port 1128 for transmission to a television or other display/speakers. In the illustrated implementation, the video and audio processing components 1120, 1122, 1124, 1126 and 1128 are mounted on the module 1114.

FIG. 11 shows the module 1114 including a USB host controller 1130 and a network interface (NW I/F) 1132, which may include wired and/or wireless components. The USB host controller 1130 is shown in communication with the CPU 1102 and the memory controller 1103 via a bus (e.g., PCI bus) and serves as host for peripheral controllers 1134. The network interface 1132 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 11, the console 1101 includes a controller support subassembly 1140, for supporting at least four game controllers 1141(1)-1141(4). The controller support subassembly 1140 includes any hardware and software components needed to support wired and/or wireless operation with an external control device, such as for example, a media and game controller. A front panel I/O subassembly 1142 supports the multiple functionalities of a power button 1143, an eject button 1144, as well as any other buttons and any LEDs (light emitting diodes) or other indicators exposed on the outer surface of the console 1101. The subassemblies 1140 and 1142 are in communication with the module 1114 via one or more cable assemblies 1146 or the like. In other implementations, the console 1101 can include additional controller subassemblies. The illustrated implementation also shows an optical I/O interface 1148 that is configured to send and receive signals (e.g., from a remote control 1149) that can be communicated to the module 1114.

Memory units (MUs) 1150(1) and 1150(2) are illustrated as being connectable to MU ports "A" 1152(1) and "B"

1152(2), respectively. Each MU 1150 offers additional storage on which games, game parameters, and other data may be stored. In some implementations, the other data can include one or more of a digital game component, an executable gaming application, an instruction set for expanding a gaming application, and a media file. When inserted into the console 1101, each MU 1150 can be accessed by the memory controller 1103.

A system power supply module 1154 provides power to the components of the gaming system 1100. A fan 1156 cools the circuitry within the console 1101.

An application 1160 comprising machine instructions is typically stored on the hard disk drive 1108. When the console 1101 is powered on, various portions of the application 1160 are loaded into the RAM 1106, and/or the caches 1110 and 1112, for execution on the CPU 1102. In general, the application 1160 can include one or more program modules for performing various display functions, such as controlling dialog screens for presentation on a display (e.g., high definition monitor), controlling transactions based on user inputs and controlling data transmission and reception between the console 1101 and externally connected devices.

As represented via block 1170, a camera (including visible, IR and/or depth cameras) and/or other sensors, such as a microphone, external motion sensor and so forth may be coupled to the system 1100 via a suitable interface 1172. As shown in FIG. 11, this may be via a USB connection or the like, however it is understood that at least some of these kinds of sensors may be built into the system 1100.

The gaming system 1100 may be operated as a standalone system by connecting the system to high definition monitor, a television, a video projector, or other display device. In this standalone mode, the gaming system 1100 enables one or more players to play games, or enjoy digital media, e.g., by watching movies, or listening to music. However, with the integration of broadband connectivity made available through the network interface 1132, gaming system 1100 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
running secure boot code to load executable instructions into an executable memory space to perform a secure boot of a device, the executable memory space being loaded with at least a part of the executable instructions for enablement and disablement of a memory protection unit (MPU);
responsive to executing the at least part of the executable instructions loaded in the memory space, enabling the MPU; and
protecting the enabled MPU from any further changes by rendering a portion of the memory space comprising the at least part of the executable instructions as non-executable.

2. The method of claim 1 wherein protecting the enabled MPU comprises preventing further modification to the memory space that contains all of the loaded executable instructions.

3. The method of claim 1 wherein an instruction of the at least a part of the executable instructions that enables the MPU is a last executable instruction of the at least a part of the executable instructions loaded in the memory space.

4. The method of claim 1 further comprising, protecting any non-selected executable instructions, by preventing further execution of the subset of executable instructions.

5. The method of claim 1 wherein the memory space includes a first memory space and a second memory space, and wherein the loaded at least part of the executable instructions comprise startup code in the first memory space and runtime code in the second memory space, in which the runtime code comprises the selected executable instructions.

6. The method of claim 5 wherein protecting the startup code comprises configuring a memory protection unit with one or more regions that contain at least the protected startup code instructions and configuring the one or more regions that contain at least the protected startup code instructions as non-executable, and enabling the memory protection unit.

7. The method of claim 5 wherein protecting the startup code comprises making the first memory space non-executable, and further comprising generating a planned exception by attempting to execute an instruction in the first memory space, the planned exception causing an exception handler to transfer code execution to the runtime code.

8. The method of claim 1 further comprising making runtime code unable to reconfigure memory space or memory attributes.

9. The method of claim 1 further comprising making runtime code unable to reconfigure memory space or memory attributes except via one or more functions that each includes protection against a return oriented programming (RoP) attack.

10. A system comprising:
a memory; and
one or more processors programmed to perform the following operations:
running secure boot code to load executable instructions into an executable memory space in the memory to perform a secure boot of a device, the executable memory space being loaded with at least a part of the executable instructions for enablement and disablement of a memory protection unit (MPU)
responsive to executing the at least part of the executable instructions loaded in the memory space, enabling the MPU; and
protecting the enabled MPU from any further changes by rendering a portion of the memory space comprising the at least part of the executable instructions as non-executable.

11. The system of claim 10 wherein the one or more processors are further programmed to protect a portion of executable memory from executing again once execution of code in the portion has completed.

12. The system of claim 10 further comprising a memory protection unit configured to provide different memory regions, and for each memory region, to enforce attributes on that region including a write attribute that determines whether write access is allowed and an execute attribute that determines whether data corresponding to instructions in that region are executable.

13. The system of claim 12 wherein executable startup code in a startup memory region configures and enables the memory protection unit, including to prevent further execution of the startup code.

14. The system of claim 12 wherein at least one region is an indexed region that is associated with a sub-region bitmask, wherein the executable memory contains executable runtime code including a function that allows changing of the sub-region bitmask for the indexed region, and wherein the function includes one or more instructions to reset the indexed region to a disabled region before the function returns to a caller.

15. The system of claim 10 wherein protecting the enabled MPU comprises preventing further modification to the memory space that contains all of the loaded executable instructions.

16. The system of claim 10 wherein the memory corresponds to a runtime code memory space, wherein other executable memory comprises startup code memory space that is executable memory until an executed instruction or set of instructions changes the startup code memory space to non-executable.

17. One or more computer-readable hardware devices having executable instructions, which when executed perform steps, comprising:

running secure boot code to load executable instructions into an executable memory space to perform a secure boot of a device, the executable memory space being loaded with at least a part of the executable instructions for enablement and disablement of a memory protection unit (MPU);

responsive to executing the at least part of the executable instructions loaded in the memory space, enabling the MPU; and protecting the enabled MPU from any further changes by rendering a portion of the memory space comprising the at least part of the executable instructions as non-executable.

18. The one or more computer-readable hardware devices of claim 17 wherein protecting the enabled MPU comprises locking each region that contains executable by configuring each region that contains executable code as executable and non-writable.

19. The one or more computer-readable hardware devices of claim 17, wherein the memory space includes a first memory space and a second memory space, and wherein the loaded at least part of the executable instructions comprise startup code in the first memory space and runtime code in the second memory space, in which the runtime code comprises the selected executable instructions.

20. The one or more computer-readable hardware devices of claim 19 wherein the one or more processors are further programmed to execute the runtime code, including executing a function, the function a) setting an index and changing configuration of a sub-region of a runtime region based upon the index, and b) and after changing the configuration, changing the index to correspond to a dummy region before returning from the function.

* * * * *